United States Patent
Bonzini et al.

(10) Patent No.: US 10,268,595 B1
(45) Date of Patent: Apr. 23, 2019

(54) EMULATING PAGE MODIFICATION LOGGING FOR A NESTED HYPERVISOR

(71) Applicant: Red Hat, Inc., Raleigh, NC (US)

(72) Inventors: Paolo Bonzini, Milan (IT); Bandan Das, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/792,345

(22) Filed: Oct. 24, 2017

(51) Int. Cl.
  *G06F 12/00* (2006.01)
  *G06F 12/1009* (2016.01)
  *G06F 12/1036* (2016.01)
  *G06F 9/455* (2018.01)

(52) U.S. Cl.
  CPC ...... *G06F 12/1009* (2013.01); *G06F 9/45558* (2013.01); *G06F 12/1036* (2013.01); *G06F 2009/45566* (2013.01); *G06F 2009/45583* (2013.01); *G06F 2212/657* (2013.01)

(58) Field of Classification Search
  None
  See application file for complete search history.

(56) References Cited

U.S. PATENT DOCUMENTS

| | | | |
|---|---|---|---|
| 9,075,642 B1 | 7/2015 | Chalmer et al. | |
| 9,122,509 B2 | 9/2015 | Deng et al. | |
| 9,122,765 B1 * | 9/2015 | Chen | G06F 17/30312 |
| 9,146,767 B2 | 9/2015 | Salsamendi et al. | |
| 9,372,984 B2 * | 6/2016 | Smith | G06F 21/00 |
| 9,489,265 B2 | 11/2016 | Scales et al. | |
| 9,519,781 B2 | 12/2016 | Golshan et al. | |
| 9,632,813 B2 | 4/2017 | Radhakrishnan | |
| 2016/0147556 A1 * | 5/2016 | Hu | G06F 9/45558 718/1 |
| 2017/0262299 A1 * | 9/2017 | Chow | G06F 9/455 |
| 2017/0262306 A1 * | 9/2017 | Wang | G06F 9/45558 |
| 2017/0286672 A1 * | 10/2017 | Sultana | G06F 21/552 |
| 2018/0173551 A1 * | 6/2018 | Dunn | G06F 9/45558 |

OTHER PUBLICATIONS

"Linux/Arch/x86/Kvm/Mmu.c", linux/mmu.c at master—torvalds/linux, GitHub, https://github.com/torvalds/linux/blob/master/arch/x86/kvm/mmu.c, Retrieval Date: Jul. 28, 2017, (pp. 1-82).

(Continued)

*Primary Examiner* — Daniel D Tsui
(74) *Attorney, Agent, or Firm* — K&L Gates LLP (57) ABSTRACT

A system and method of emulating page table modification logging includes a host hypervisor identifying a first mapping in a nested extended page table and identifying a first bit in a first page table entry of the nested extended page table. The host hypervisor creates a second write-protected mapping in a shadow extended page table. The nested guest performs a first write access to a first page in the nested guest. The first page has a first nested guest physical address corresponding to the second mapping. The host hypervisor triggers an exit from the nested guest to the host hypervisor. The host hypervisor identifies that the first write access occurred and stores the first nested guest physical address in a page modification log (PML) buffer of the nested hypervisor. The host hypervisor sets the first bit as a dirty bit and returns to the nested guest.

20 Claims, 7 Drawing Sheets

(56) References Cited

OTHER PUBLICATIONS

"Page Modification Logging for Virtual Machine Monitor White Paper", Jan. 2015, https://www.intel.com/content/dam/www/public/us/en/documents/white-papers/page-modification-logging-vmm-white-paper.pdf (7 pages).

"Running Hyper-V in a QEMU/KVM Guest", Feb. 24, 2017, https://ladipro.wordpress.com/2017/02/24/running-hyperv-in-kvm-guest/, Ladipro (5 pages).

\* cited by examiner

EMULATING PAGE MODIFICATION LOGGING FOR A NESTED HYPERVISOR

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for a guest virtual machine, rather than a guest virtual machine actually having a dedicated physical processor.

SUMMARY

The present disclosure provides new and innovative methods and systems for emulating page modification logging. An example method includes emulating, by a host hypervisor, a nested environment. The nested environment includes a guest, virtualized by the host hypervisor. The guest includes a nested hypervisor and a nested guest. The host hypervisor identifies a first mapping in a nested extended page table. The host hypervisor identifies a first bit in a first page table entry of the nested extended page table and the first bit is clean. The host hypervisor creates a second mapping that is write-protected in a shadow extended page table. The nested guest performs a first write access to a first page in the nested guest. The first page has a first nested guest physical address corresponding to the second mapping. Responsive to performing the first write access to the first page, the host hypervisor triggers a first exit from the nested guest to the host hypervisor. The host hypervisor identifies that the first write access occurred. The host hypervisor stores the first nested guest physical address in a page modification log ("PML") buffer of the nested hypervisor. The host hypervisor sets the first bit as a dirty bit. The host hypervisor returns to the nested guest.

Additional features and advantages of the disclosed methods and system are described in, and will be apparent from, the following Detailed Description and the Figures.

DETAILED DESCRIPTION OF EXAMPLE EMBODIMENTS

In computer systems executing a guest virtual machine, a host hypervisor may typically manage interactions with virtualized devices, such as virtual processors, virtual memory devices, and virtual input-output devices. Likewise, computer systems with a host hypervisor may also implement one or more nested hypervisors. A nested hypervisor may be used as a desirable way to pass through typical hardware virtualization extensions for performance enhancement. In systems where one or more nested hypervisors are implemented (e.g., a nested hypervisor is virtualized on top of the host hypervisor), the nested hypervisor may support (or attempt to support) interactions with virtualized devices (e.g., a virtual processor above the nested hypervisor). Nonetheless, these virtualized devices are ultimately supported by the host hypervisor. In addition to supporting virtualized devices (e.g., the virtual processor above the nested hypervisor), it is useful for the nested hypervisor to support other features of computer systems, such as page modification logging. It may therefore be advantageous to optimize interactions between the host hypervisor and the nested hypervisor.

Generally, page modification logging enables a hardware supported mechanism for a hypervisor to monitor guest physical pages (e.g., via a PML buffer). Typically, the hypervisor will set up a PML buffer. Each time a guest page (e.g., a page in guest memory) is dirtied or written to, the physical processor writes the address of the page to the PML buffer. Tracking addresses of dirtied or written pages may advantageously avoid the need for the hypervisor to write-protect a page (e.g., to trap and monitor writes) for certain cases (e.g., migration). It is desirable to extend functionality related to PML buffers to computing environments implementing a nested hypervisor. However, a typical complication is that the host hypervisor might be using the PML buffer for other purposes (e.g., to track guest pages). Thus, it would be difficult for the host hypervisor and the nested hypervisor to share functionality of the PML buffer. Typically, hypervisors do not offer or advertise page modification logging to nested hypervisors. Rather, in practice, nested hypervisors may typically write-protect their guest pages (e.g., for protection during a migration operation).

By emulating a PML buffer for a nested hypervisor, the nested hypervisor is able to set up its own buffer. For example, the nested hypervisor is not required to write-protect its guest pages. This may advantageously avoid inefficient switching by the host processor, between the nested hypervisor and the nested guest. Similarly, by emulating a PML buffer, the host hypervisor is able to track dirtied nested guest physical addresses. The present disclosure describes advantageous systems and methods for emulating page modification logging for a nested hypervisor to reduce overhead and increase efficiency of virtualization applications.

Figure 1:
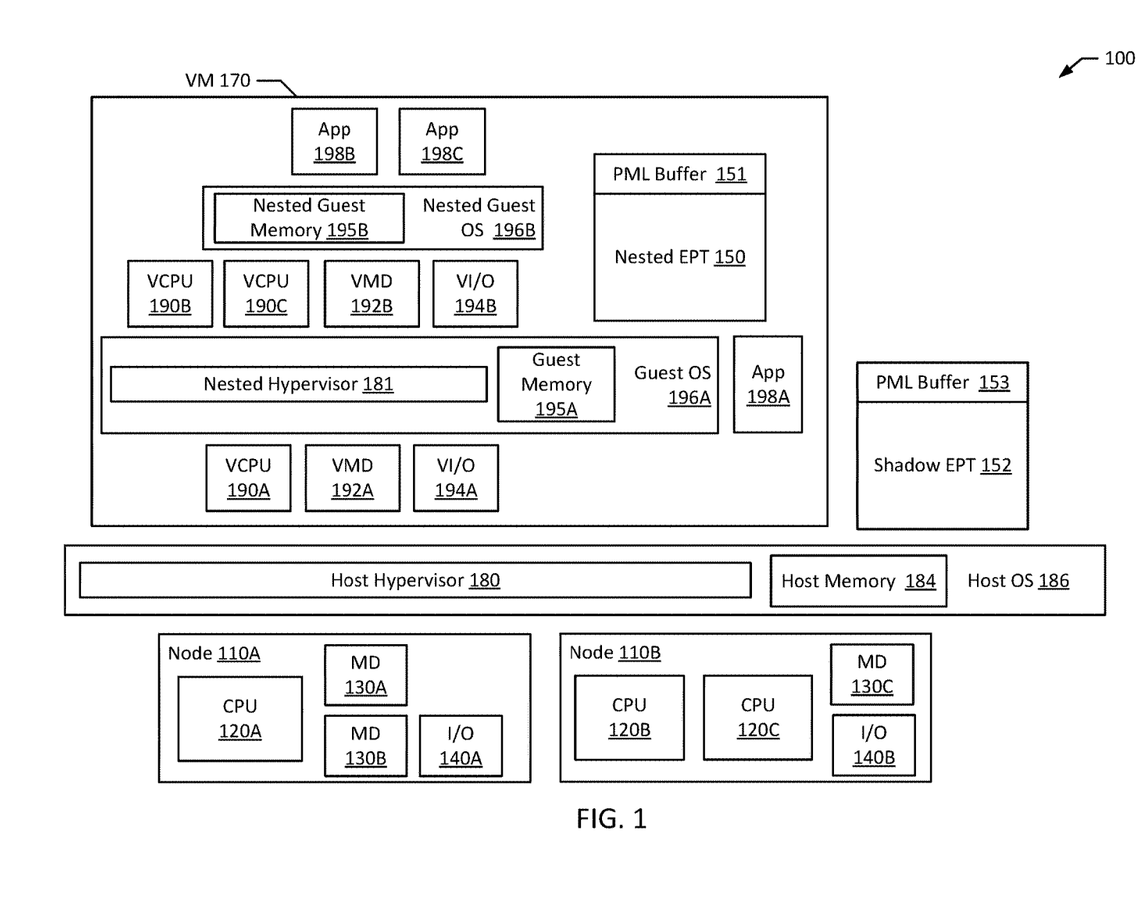
FIG. 1 is a block diagram of an example multi-processor computer system according to an example of the present disclosure.

FIG. 1 depicts a high-level component diagram of an example multi-processor computer system 100 in accordance with one or more aspects of the present disclosure. The computer system 100 may include one or more interconnected nodes 110A-B. Each node 110A-B may, in turn, include one or more physical processors (e.g., CPU 120A-C) communicatively coupled to memory devices (e.g., MD 130A-C) and input/output devices (e.g., I/O 140A-B) Likewise, in an example, nodes 110A-B may include a hardware device. In an example, a hardware device may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processors 120A-C refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor, which is typically capable of executing one instruction at a time (or process a single pipeline of instructions), or a multi-core processor, which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, an input/output device 140A-B refers to a device capable of providing an interface between one or more processors and an external device. The external device's operation is based on the processor inputting and/or outputting data.

Processors 120A-C may be interconnected to additional processors using a variety of techniques, ranging from a point-to-point processor interconnect to a system area network, such as an Ethernet-based network. Local connections within each node 110A-B, including the connections between a processor 120A and a memory device 130A-B, between a processor 120A and an I/O device 140A, etc., may be provided by one or more local buses of suitable architecture, for example, peripheral component interconnect (PCI). As used herein, a device of the host operating system (host OS) 186 (or host device) may refer to CPU 120A-C, MD 130A-C, I/O 140A-B, a software device, and/or hardware device.

As noted above, computer system 100 may run a virtual machine 170 (also referred to herein as guest virtual machine or guest), by executing a software layer (e.g., hypervisor 180, also referred to herein as host hypervisor 180) above the hardware and below the guest virtual machine 170, as schematically shown in FIG. 1. In an example, the host hypervisor 180 may be a component of the host operating system 186 executed by the computer system 100. In another example, the host hypervisor 180 may be provided by an application running on the host operating system 186, or may run directly on the computer system 100 without an operating system beneath it. The host hypervisor 180 may virtualize the physical layer, including processors, memory, and I/O devices, and present this virtualization to the guest virtual machine 170 as devices, including virtual processors (e.g., VCPU 190A), virtual memory devices (e.g., VMD 192A), and/or virtual I/O devices (e.g., VI/O 194A). Guest virtual machine 170 may run on any type of dependent, independent, compatible, and/or incompatible applications on the underlying hardware and OS 186.

In an example, applications 198A-C run on the guest virtual machine 170 may be dependent on the underlying hardware and/or OS 186. In another example, applications 198A-C run on the guest virtual machine 170 may be independent of the underlying hardware and/or OS 186. Additionally, applications 198A-C run on the guest virtual machine 170 may be compatible with the underlying hardware and/or OS 186. In an example, a device may be implemented as guest virtual machine 170.

In an example, the guest virtual machine 170 may execute a guest operating system (guest OS) 196A which may utilize the underlying VCPU 190A, VMD 192A, and VI/O device 194A. One or more applications 198A-C may be running on guest virtual machine 170 under the guest operating system 196A. Processor virtualization may be implemented by the host hypervisor 180 scheduling time slots on one or more physical processors 120A-C such, that from the guest operating system's perspective, those time slots are scheduled on virtual processor 190A.

The host hypervisor 180 controls and limits access to memory (e.g., memory allocated to the guest virtual machine 170 and memory allocated to the guest operating system 196A, such as guest memory 195A provided to guest operating system 196A, etc.). For example, guest memory 195A may be divided into a plurality of memory pages. Access to these memory pages is controlled and limited by the host hypervisor 180. Likewise, for example, guest memory 195A allocated to the guest operating system 196A is mapped from host memory 184, such that when a guest application 198A-C or a device uses or accesses a memory page of guest memory 195A, the guest application 198A-C is actually using or accessing host memory 184. Host memory 184 may also be referred to as host physical memory 184, as it physically exists on a computer system (e.g., system 100). In an example, computer system 100 may include an input-output memory management unit, which may be used for mappings.

Guest virtual machine 170 and, more particularly, guest operating system 196A may include additional virtualized components, which are effectively supported by the host hypervisor 180 in a similar way. For example, guest operating system 196A may include a nested hypervisor 181. A nested guest operating system 196B (which may also be referred to herein as nested guest virtual machine or nested guest) and a nested guest memory 195B may run on the nested hypervisor 181. The nested hypervisor 181 may control and limit access to memory (e.g., memory allocated to the nested guest operating system 196B, such as nested guest memory 195B). The nested hypervisor 181 may virtualize a layer, including processors, memory, and I/O devices, and present this virtualization to guest virtual machine 170 as devices, including virtual processors (e.g., VCPU 190B-C), virtual memory devices (e.g., VMD 192B), and/or virtual I/O devices (e.g., VI/O 194B). For example, nested hypervisor 181 has virtual processors (e.g., VCPU 190B, VCPU 190C, etc.) allocated to it; however, in practice, the host hypervisor 180 is actually supporting device management (e.g., via VCPU 190A).

The nested hypervisor 181 may also virtualize a nested extended page table ("EPT") (e.g., nested EPT 150), which may include a PML buffer (e.g., PML buffer 151). The nested EPT 150 may be used to store mappings, bits, identifiers, etc. The host hypervisor 180 may access this nested EPT 150 (e.g., to identify mappings and bits, store mappings and bits, modify mappings and bits, etc.). The PML buffer 151 may, similarly, be used to store information (e.g., nested guest physical addresses). Similarly, the host hypervisor 180 may virtualize a shadow EPT 152, which may include a PML buffer 153. The shadow EPT 152 may be used to store mappings, bits, identifiers, etc. The host hypervisor 180 may access this shadow EPT 152 (e.g., to identify mappings and bits, store mappings and bits, modify mappings and bits, etc.). The PML buffer 153 may, similarly, be used to store information (e.g., nested guest physical addresses). In an example, the shadow EPT 152 is a combination of nested EPT 150 and another EPT(s), such as another nested EPT and/or a traditional EPT.

Figure 2A:
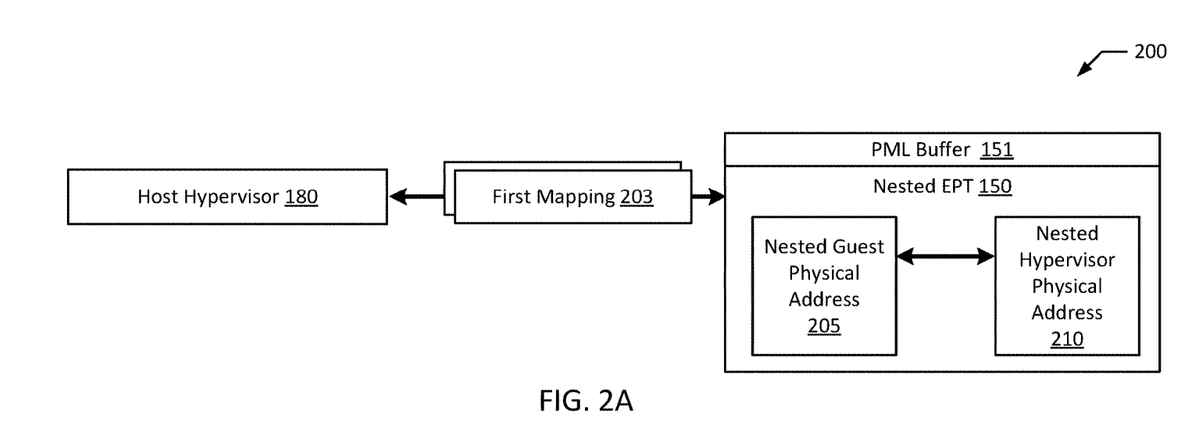
FIGS. 2A-B are block diagrams illustrating an example system emulating page modification logging according to an example of the present disclosure.
Figure 2B:
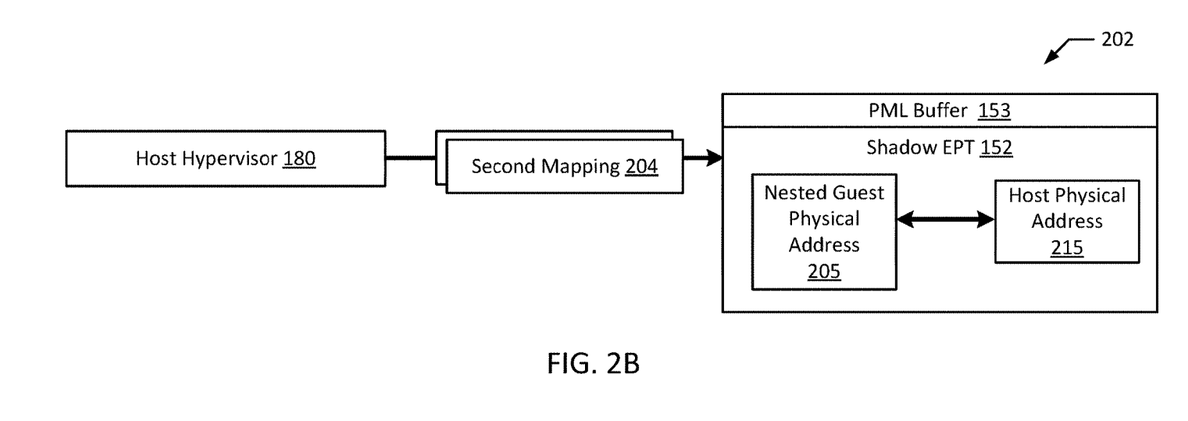

FIGS. 2A-B are block diagrams illustrating an example system emulating page modification logging according to an example of the present disclosure. More particularly, configurations 200 and 202 illustrate relationships between mappings, page tables, and addresses stored therein. For example, configuration 200 illustrates that host hypervisor 180 is configured to identify first mapping 203 in the nested EPT 150. Nested EPT 150 may include PML buffer 151. In an example, the nested EPT 150 maps a nested guest physical address 205 to a nested hypervisor physical address 210 (e.g., an address in guest memory 195A).

Likewise, for example, configuration 202 illustrates that host hypervisor 180 is configured to create second mapping 204 in the shadow EPT 152. Shadow EPT 152 may include PML buffer 153. In an example, the shadow EPT 152 maps the nested guest physical address 205 to a host physical address 215 (e.g., an address in host memory 184). In a different example, the second mapping 204 is write-protected. In a related example, the host hypervisor 180 may, at a later time, replace the second mapping 204 with a third mapping that is write-enabled.

In a related example, EPT tables may be referred to with numerical designations. For example, host hypervisor 180 may be referred to as Level 0, nested hypervisor 181 may be referred to as Level 1, and nested guest 196B may be referred to as Level 2. In this example, EPT01 maps guest physical addresses to host physical addresses (e.g., pointed to by a Virtual Machine Control Structure 01); EPT12 maps nested guest physical addresses to nested hypervisor physical addresses (e.g., pointed to by a Virtual Machine Control Structure 12); EPT02 maps nested guest physical addresses to host physical addresses (e.g., pointed to by a Virtual Machine Control Structure 02).

Figure 3:
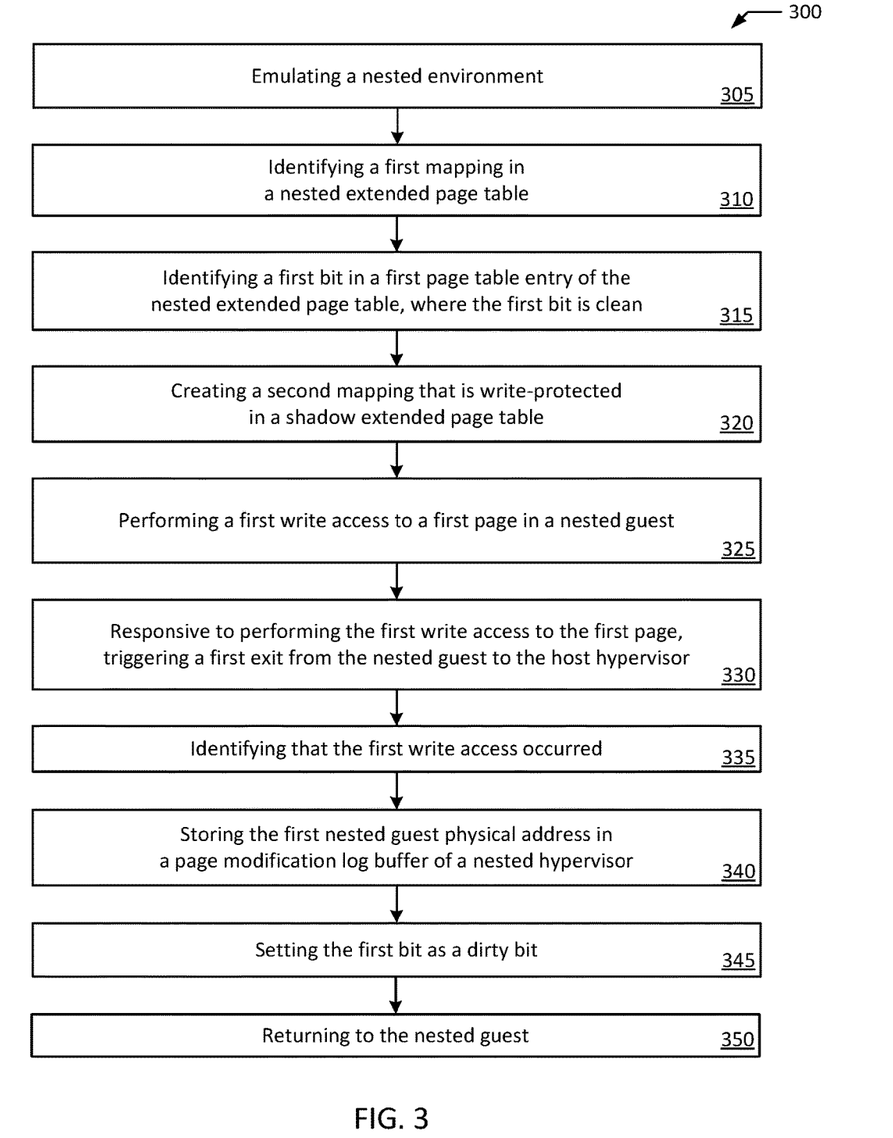
FIG. 3 is a flowchart illustrating an example method of emulating page modification logging according to an example of the present disclosure.

FIG. 3 is a flowchart illustrating an example method of emulating page modification logging according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described may be optional. The method 300 may be performed by processing logic that may include hardware (circuitry, dedicated logic, etc.), software, or a combination of both. For example, the method 300 may be performed by host hypervisor 180 interacting with nested hypervisor 181, guest virtual machine 170, nested guest 196B, nested EPT 150, and shadow EPT 152.

The example method 300 starts with emulating a nested environment (block 305). For example, host hypervisor 180 emulates guest virtual machine 170, which includes nested hypervisor 181 and nested guest 196B, virtualized by nested hypervisor 181. The example method 300 includes identifying a first mapping in a nested EPT (block 310). For example, host hypervisor 180 identifies first mapping 203 in the nested EPT 150. In an example, first mapping 203 maps a nested guest physical address 205 to a nested hypervisor physical address 210. The example method 300 includes identifying a first bit in a first page table entry of the nested EPT, where the first bit is clean (block 315). For example, host hypervisor 180 identifies a first bit in a page table entry within nested EPT 150. The example method 300 includes creating a second mapping that is write-protected in a shadow EPT (block 320). For example, host hypervisor 180 creates second mapping 204 in the shadow EPT 152. In an example, second mapping 204 maps the nested guest physical address 205 to a host physical address 215.

The example method 300 includes performing a first write access to a first page in the nested guest (block 325). The first page has a first nested guest physical address corresponding to the second mapping. For example, nested guest 196B attempts to write (or writes) to a page in nested guest memory 195B, where the page has nested guest physical address 205 corresponding to second mapping 204.

The example method 300 includes, responsive to performing the first write access to the first page, triggering a first exit from the nested guest to the host hypervisor (block 330). For example, host hypervisor 180 triggers an exit from nested guest 196B to host hypervisor 180. The example method 300 includes, identifying that the first write occurred (block 335). For example, host hypervisor 180 identifies that the nested guest 196B attempted to write (or wrote) to a page in nested guest memory 195B. In an example, identifying that the first write occurred may be referred to as trapping an operation (e.g., the write or attempt to write). The example method 300 includes storing the first nested guest physical address in a PML buffer of the nested hypervisor (block 340). For example, host hypervisor 180 stores nested guest physical address 205 in PML buffer 151. The example method 300 includes setting the first bit as a dirty bit (block 345). For example, host hypervisor 180 sets the first bit as dirty, such that the first bit is no longer clean. The example method 300 includes returning to the nested guest (block 350). For example, host hypervisor 180 returns control to nested guest 196B and/or the hypervisor 180 returns to executing the nested guest 196B.

Figure 4A:
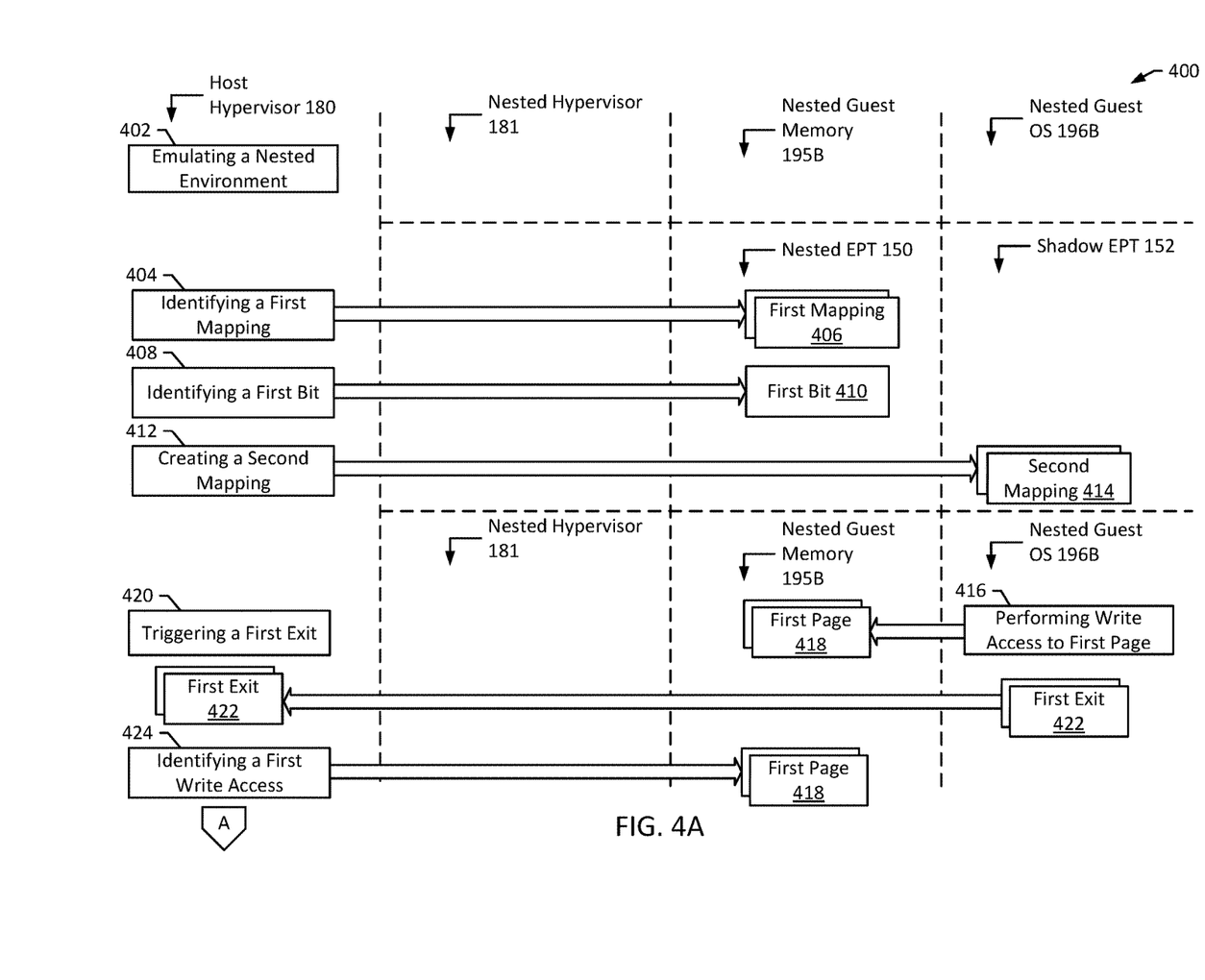
FIGS. 4A-C are flow diagrams illustrating page modification logging emulation according to an example of the present disclosure.
Figure 4B:
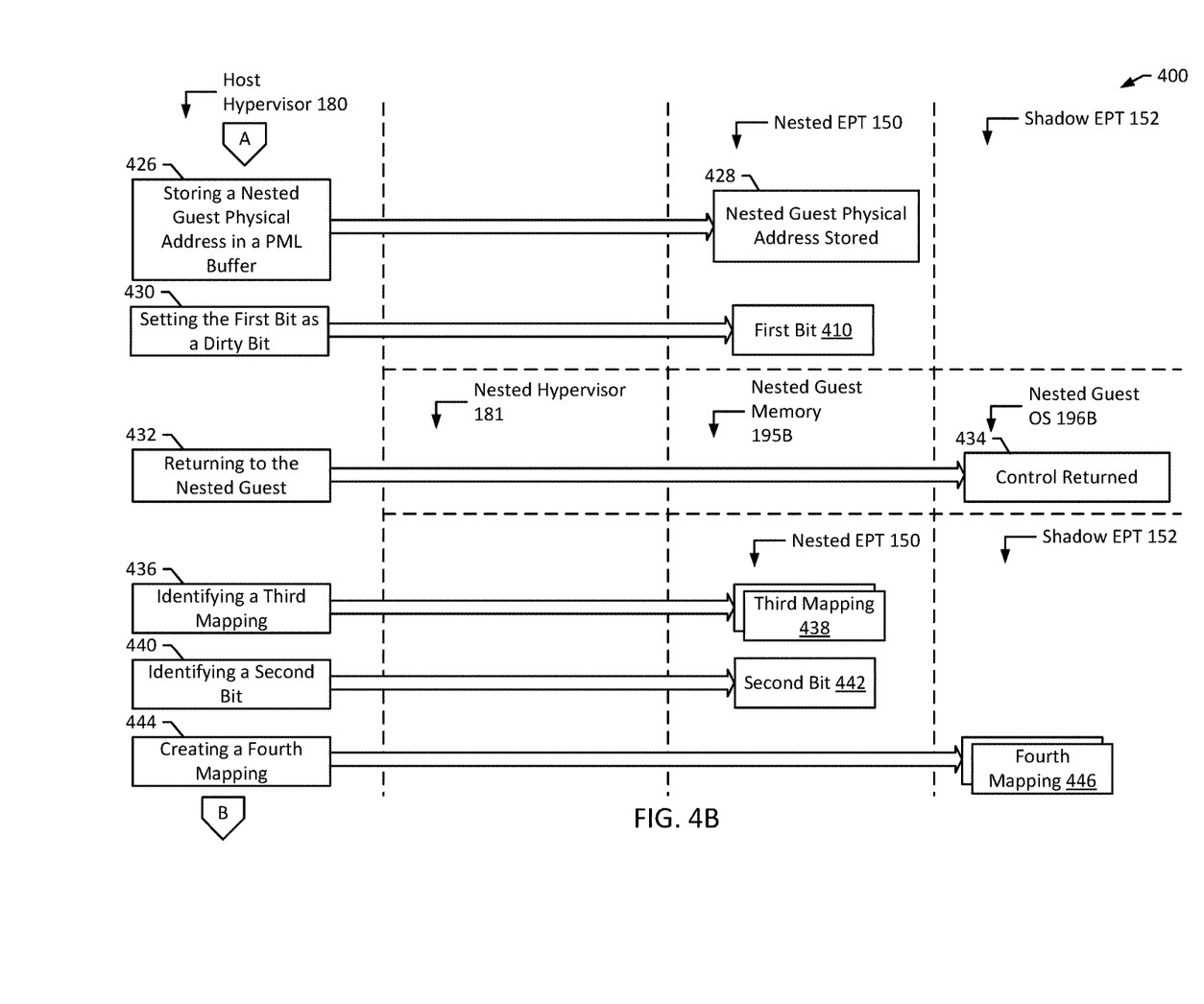
Figure 4C:
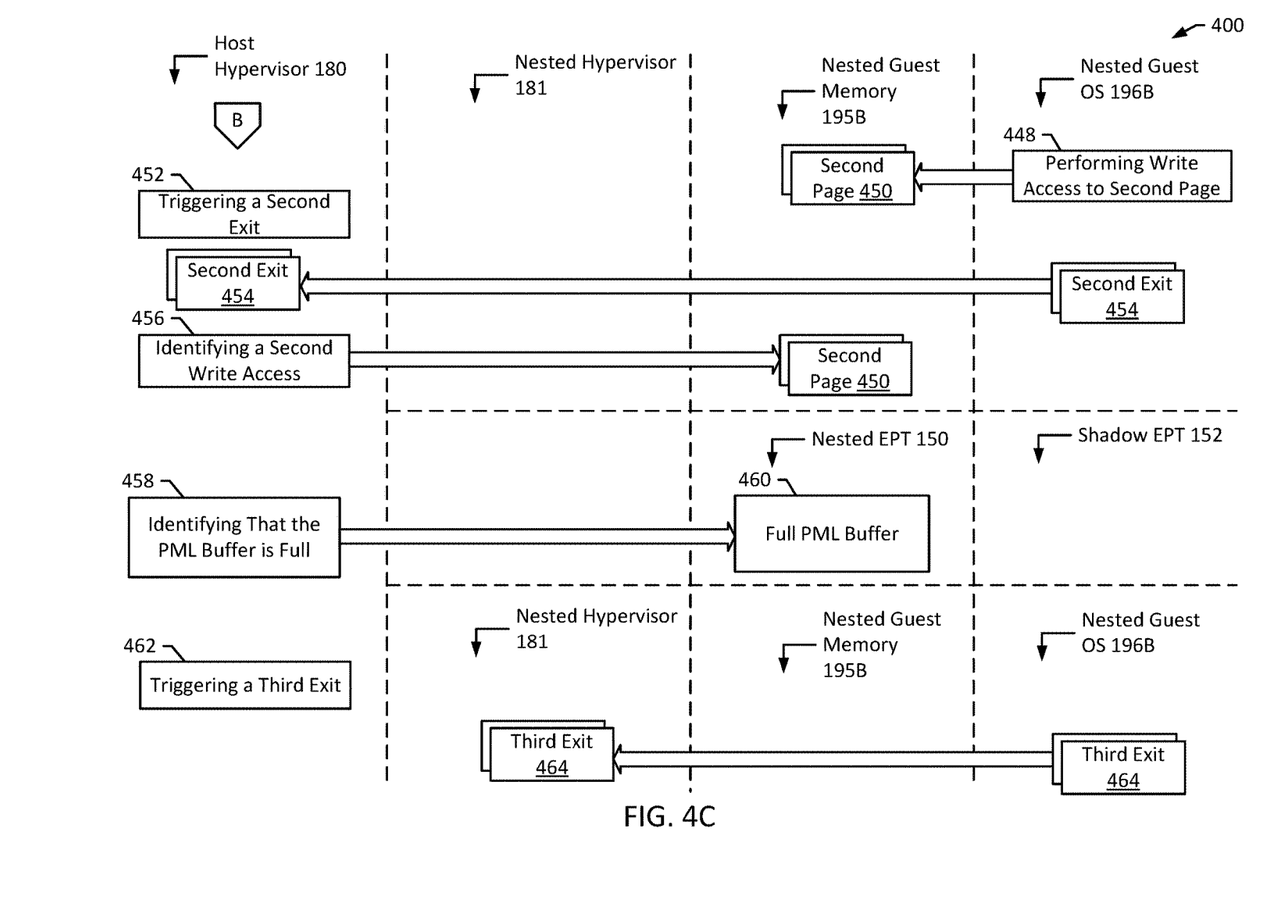

FIGS. 4A-C are flow diagrams illustrating page modification logging emulation according to an example of the present disclosure. Although the example method 400 is described with reference to the flow diagram illustrated in FIGS. 4A-C, it will be appreciated that many other methods of performing the acts associated with the method may be used. For example, the order of some of the blocks may be changed, certain blocks may be combined with other blocks, and some of the blocks described may be optional. The method 400 may be performed by processing logic that may include hardware (circuitry, dedicated logic, etc.), software, or a combination of both. For example, the method 300 may be performed by host hypervisor 180 interacting with nested hypervisor 181, guest virtual machine 170, nested guest 196B, nested EPT 150, and shadow EPT 152.

In the illustrated example in FIG. 4A, the host hypervisor 180 emulates a nested environment (block 402). For example, host hypervisor 180 emulates guest virtual machine 170, which includes nested hypervisor 181, and nested guest memory 195B and nested guest 196B, virtualized by nested hypervisor 181. Host hypervisor 180 may further emulate nested EPT 150, which may include PML buffer 151. The host hypervisor 180 identifies first mapping 406 in the nested EPT 150 (block 404). In an example, first mapping 406 maps a first nested guest physical address to a first nested hypervisor physical address. The host hypervisor 180 then identifies a first bit 410 in a first page table entry of the nested EPT 150 (block 408). In an example, the first bit 410 is clean. The host hypervisor 180 creates a second mapping 414 in a shadow EPT 152 (block 412). For example, the shadow EPT 152 is emulated by host hypervisor 180, and is a non-nested EPT (e.g., compared to nested EPT 150). In an example, second mapping 414 maps the first nested guest physical address to a first host physical address. In an example, second mapping 414 is write-protected. For example, by identifying a non-dirtied page (e.g., a page with a clean bit), the host hypervisor 180 may protect non-dirtied pages by triggering exits if an entity (e.g., the nested guest 196B) attempts to dirty the page(s).

In a related example, the nested hypervisor 181 associates a first virtual machine control structure with the nested EPT 150. Similarly, the nested 181 hypervisor associates the first virtual machine control structure with the PML buffer 151 of the nested hypervisor 181 (e.g., of the nested EPT 151). The nested hypervisor 181 sets a first PML index in the first virtual machine control structure. The host hypervisor 180 associates a second virtual machine control structure with the shadow EPT 151.

Continuing on, the nested guest 196B performs a write access to a first page 418 (block 416). For example, the first page 418 may be a memory page, stored in nested guest memory 195B. In an example, the write access includes an attempt to access first page 418. In another example, the write access includes actually accessing first page 418. In another example, the write access includes writing to a memory location in host memory 184. In another example, more generally, processor access to guest paging structures is treated as writes. For example, on Intel® platforms, this is typically only possible when an access/dirty function is enabled. Although the access/dirty function may not be required to emulate a nested PML, access/dirty provides the conditions under which emulation of PML is effective. However, for example, emulation does not require the presence of PML on host hardware.

Continuing on, the first page 418 has a nested guest physical address corresponding to the second mapping 414 (e.g., the second mapping 414 stored in the shadow EPT 152). Responsive to performing the first write access (block 416) to the first page 418, the host hypervisor 180 triggers a first exit 422 (block 420). For example, the first exit 422 is an exit from the nested guest 196B to the host hypervisor 180. In an example, the first exit is triggered by an extended page table violation. For example, if access/dirty is enabled, accesses are treated as writes and the corresponding page tables are accordingly write-protected by the host hypervisor 180. The host hypervisor 180 then identifies that the first write access occurred (block 424). For example, the host hypervisor 180 may inspect the first page 418, to determine whether the nested guest 196B modified the first page 418 or attempted to modify the first page 418.

Continuing on to FIG. 4B, the host hypervisor 180 stores the first nested guest physical address in a PML buffer of the nested hypervisor 181 (blocks 426 and 428). For example, host hypervisor 180 stores the first nested guest physical address in PML buffer 151, included on nested EPT 150. In an example, PML buffer 151 is a 4 KB buffer. In a related example, PML buffer 153, included on shadow EPT 152, is similarly a 4 KB buffer.

In a related example, storing the first nested guest physical address in PML buffer 151 includes reading, by the nested hypervisor 181, the first PML index. The nested hypervisor 181 computes a guest physical address from the first PML index and the PML buffer 151 of the nested hypervisor 181. The host hypervisor 180 stores the first nested guest physical address at the first nested hypervisor physical address. The nested hypervisor 181 decrements the first PML index.

Continuing on, the host hypervisor 180 sets the first bit 410 as a dirty bit (block 430). In an example, the first bit 410 is in the first page table entry of the nested EPT 150. In an example, the host hypervisor 180 has enabled an access/dirty function associated with the nested guest 196B. In an example, responsive to setting the first bit 410 as the dirty bit, the host hypervisor 180 replaces second mapping 414, which is write-protected, with a replacement mapping that is write-enabled. For example, once a particular page is dirtied, the host hypervisor 180 may determine that the particular page no longer needs protection.

The host hypervisor 180 returns to the nested guest 196B (blocks 432 and 434). For example, host hypervisor 180 returns control to the nested guest 196B and/or the hypervisor 180 returns to executing the nested guest 196B. The host hypervisor 180 identifies third mapping 438 in the nested EPT 150 (block 436). In an example, third mapping 438 maps a second nested guest physical address to a second nested hypervisor physical address. The host hypervisor 180 then identifies a second bit 442 in a second page table entry of the nested EPT 150 (block 440). In an example, the second bit 442 is clean. The host hypervisor 180 creates a fourth mapping 446 in the shadow EPT 152 (block 444). In an example, fourth mapping 446 maps the second nested guest physical address to a second host physical address. In an example, fourth mapping 446 is write-protected.

In a related example, the nested hypervisor 181 associates a third virtual machine control structure with the nested EPT 150. Similarly, the nested hypervisor 181 associates the third virtual machine control structure with the PML buffer 151 of the nested hypervisor 181 (e.g., of the nested EPT 151). The nested hypervisor 181 sets a second PML index in the third virtual machine control structure. The host hypervisor 180 associates a fourth virtual machine control structure with the shadow EPT 151.

Continuing on to FIG. 4C, the nested guest 196B performs a write access to a second page 450 (block 448). For example, the second page 450 may be a memory page, stored in nested guest memory 195B. In an example, the write access includes an attempt to access second page 450. In another example, the write access includes actually accessing second page 450. The second page 450 has a nested guest physical address corresponding to the fourth mapping 446 (e.g., the fourth mapping 446 stored in the shadow EPT 152). Responsive to performing the second write access (block 448) to the second page 450, the host hypervisor 180 triggers a second exit 454 (block 452). For example, the second exit 454 is an exit from the nested guest 196B to the host hypervisor 180. The host hypervisor 180 then identifies that the second write access occurred (block 456). For example, the host hypervisor 180 may inspect the second page 450, to determine whether the nested guest 196B modified the second page 450 or attempted to modify the second page 450.

The host hypervisor 180 identifies that the PML buffer of the nested hypervisor 181 is full (blocks 458 and 460). For example, the host hypervisor 180 identifies that the PML buffer 151 included with the nested EPT 150 is full. In an example, this may include the hardware generating a "PML FULL" VMEXIT event. For example, the host hypervisor 180 may emulate a PML exit such that, from the perspective of the nested hypervisor 181, a "PML FULL" exit has occurred. The host hypervisor 180 triggers a third exit 464

(block 462). For example, the third exit 464 is an exit from the nested guest 196B to the nested hypervisor 181. In an example, upon occurrence of the third exit 464, the nested hypervisor 181 may flush the PML buffer 151 (e.g., deleting some or all nested guest physical addresses from the PML buffer 151) and may further re-start the entire operation.

In a related example, the host hypervisor 180 identifies that the PML buffer 151 of the nested hypervisor 181 is full by reading the second PML index and verifying that the second PML index is zero.

Figure 5:
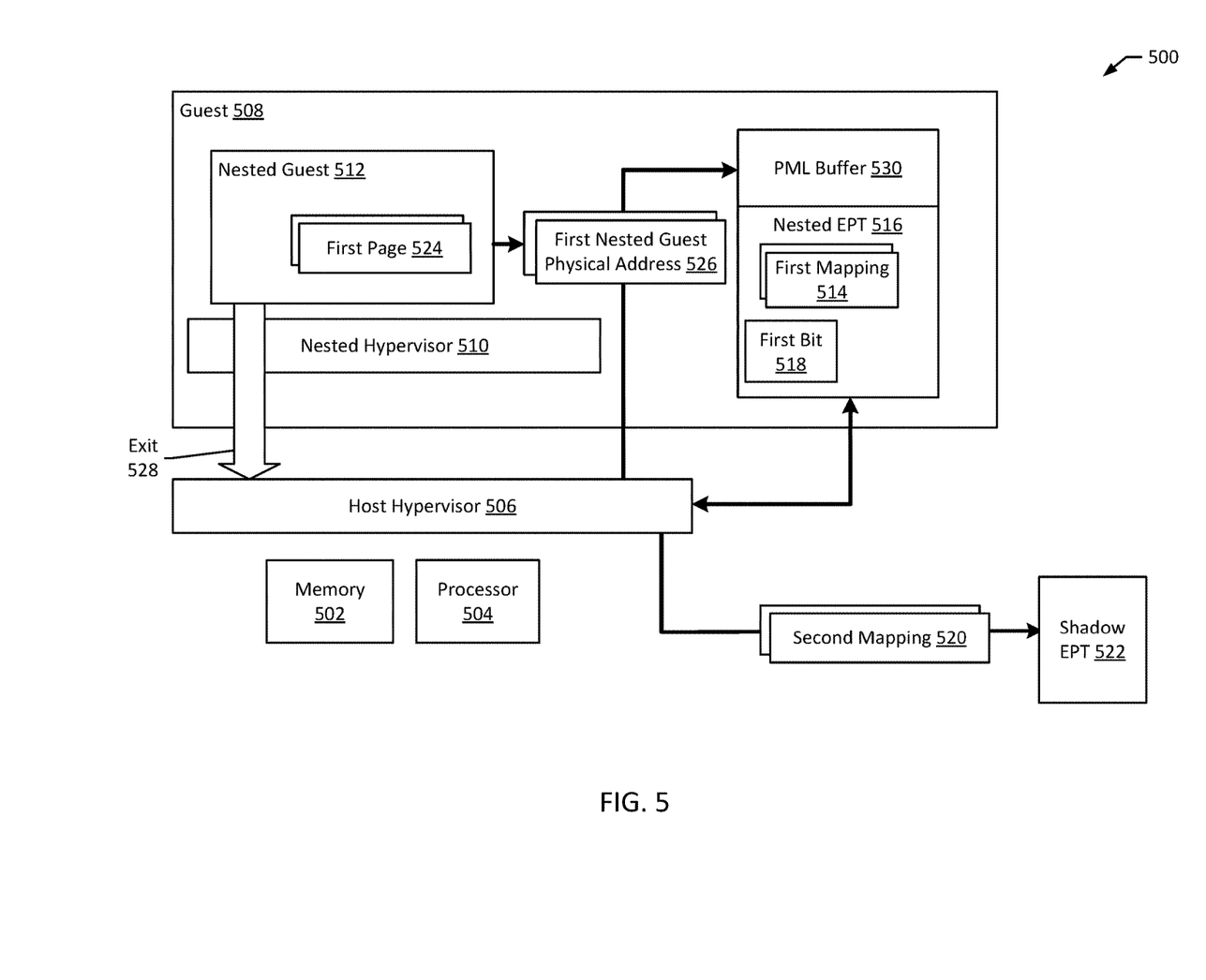
FIG. 5 is a block diagram of an example computer system according to an example of the present disclosure.

FIG. 5 is a block diagram of an example computer system 500 according to an example of the present disclosure. The computer system 500 may include a memory 502 and a processor 504 in communication with the memory 502. The computer system 500 may also include a host hypervisor 506 executing on the processor 504. The computer system 500 may also include a guest 508 (e.g., guest virtual machine 170) executing on the processor 504. The guest 508 may include a nested hypervisor 510 and a nested guest 512.

The host hypervisor 506 identifies a first mapping 514 in a nested extended page table 516. The host hypervisor 506 identifies a first bit 518 in a first page table entry of the nested extended page table 516. In an example, the first bit 518 is clean. The host hypervisor 506 creates a second mapping 520 in a shadow extended page table 522. The nested guest 512 performs a first write access to a first page 524 in the nested guest 512. The first page 524 has a first nested guest physical address 526 corresponding to the second mapping 520.

Responsive to performing the first write access to the first page 524, the host hypervisor 506 triggers a first exit 528 from the nested guest 512 to the host hypervisor 506. The host hypervisor 506 identifies that the first write access occurred. The host hypervisor 506 stores the first nested guest physical address 526 in a page modification log buffer 530 of the nested hypervisor 510. In an example, the page modification log buffer 530 is associated with the nested extended page table 516. The host hypervisor 506 sets the first bit 518 as a dirty bit. The host hypervisor 506 returns to the nested guest 512. Accordingly, example computer system 500 may advantageously emulate page modification logging for a nested hypervisor.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures. It should also be noted that a hypervisor may be referred to differently in various systems, for example, as a virtual machine monitor. Any program or component performing steps of the host hypervisor as described herein may be a hypervisor in accordance with the present disclosure.

It should be understood that various changes and modifications to the examples described herein are apparent. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   emulating a nested environment, wherein the nested environment includes a guest virtualized by a host hypervisor, wherein the guest includes a nested hypervisor and a nested guest;
   identifying a first mapping in a nested extended page table;
   identifying a first bit in a first page table entry of the nested extended page table, wherein the first bit is clean;
   creating a second mapping that is write-protected in a shadow extended page table;
   performing a first write access to a first page in the nested guest, wherein the first page has a first nested guest physical address corresponding to the second mapping;
   responsive to performing the first write access to the first page, triggering a first exit from the nested guest to the host hypervisor;
   identifying that the first write access occurred;
   storing the first nested guest physical address in a page modification log (PML) buffer of the nested hypervisor;
   setting the first bit as a dirty bit; and
   returning to the nested guest.

2. The method of claim 1, wherein responsive to setting the first bit as the dirty bit, the host hypervisor replaces the second mapping that is write-protected mapping with a third mapping that is write-enabled.

3. The method of claim 1, wherein performing the first write access to the first page in the nested guest includes writing to a memory location in a host memory.

4. The method of claim 1, further comprising:
   identifying a third mapping in the nested extended page table;
   identifying a second bit in a second page table entry of the nested extended page table, wherein the second bit is clean;
   creating a fourth mapping that is write-protected in the shadow extended page table;
   performing a second write access to a second page in the nested guest, wherein the second page has a second nested guest physical address corresponding to the fourth mapping;
   responsive to performing the second write access to the second page, triggering a second exit from the nested guest to the host hypervisor;
   identifying that the second write access occurred;
   identifying that the PML buffer of the nested hypervisor is full; and
   triggering an exit from the nested guest to the nested hypervisor.

5. The method of claim 4, wherein:
   the nested extended page table maps the second nested guest physical address to a nested hypervisor physical address,
   the shadow extended page table maps the second nested guest physical address to a host physical address.

6. The method of claim 4, further comprising:
   associating a first virtual machine control structure with the nested extended page table;
   associating the first virtual machine control structure with the PML buffer of the nested hypervisor;
   setting a first PML index in the first virtual machine control structure; and associating a second virtual machine control structure with the shadow extended page table.

7. The method of claim 6, wherein storing the first nested guest physical address in the PML buffer of the nested hypervisor includes:
reading the first PML index,
computing a guest physical address from the first PML index and the PML buffer of the nested hypervisor,
storing the first nested guest physical address at a nested hypervisor physical address, and
decrementing the first PML index.

8. The method of claim 6, further comprising:
associating a third virtual machine control structure with the nested extended page table;
associating the third virtual machine control structure with the PML buffer of the nested hypervisor;
setting a second PML index in the third virtual machine control structure; and
associating a fourth virtual machine control structure with the shadow extended page table.

9. The method of claim 8, wherein identifying that the PML buffer of the nested hypervisor is full, includes:
reading the second PML index, and
verifying that the second PML index is zero.

10. The method of claim 1, wherein the nested extended page table maps nested guest physical addresses to nested hypervisor physical addresses and the shadow extended page table maps nested guest physical addresses to host physical addresses.

11. The method of claim 1, wherein the first exit is triggered by an extended page table violation.

12. The method of claim 1, wherein the host hypervisor has enabled an access/dirty function associated with the nested guest.

13. A system comprising:
a memory;
one or more processors, in communication with the memory;
a host hypervisor, configured to execute on the one or more processors; and
a guest, configured to execute on one or more processors, the guest including:
a nested hypervisor, and
a nested guest,
wherein the host hypervisor is configured to:
identify a first mapping in a nested extended page table;
identify a first bit in a first page table entry of the nested extended page table, wherein the first bit is clean;
create a second mapping that is write-protected in a shadow extended page table;
wherein the nested guest is configured to perform a first write access to a first page in the nested guest, wherein the first page has a first nested guest physical address corresponding to the second mapping; and
wherein, responsive to performing the first write access to the first page, the host hypervisor is configured to:
trigger a first exit from the nested guest to the host hypervisor;
identify that the first write access occurred;
store the first nested guest physical address in a page modification log (PML) buffer of the nested hypervisor;
set the first bit as a dirty bit; and
return to the nested guest.

14. The system of claim 13, wherein the host hypervisor is further configured to:
identify a third mapping in the nested extended page table;
identify a second bit in a second page table entry of the nested extended page table, wherein the second bit is clean;
create a fourth mapping that is write-protected in the shadow extended page table;
wherein the nested guest is configured to perform a second write access to a second page in the nested guest, wherein the second page has a second nested guest physical address corresponding to the fourth mapping; and
wherein, responsive to performing the second write access to the second page, the host hypervisor is configured to:
trigger a second exit from the nested guest to the host hypervisor;
identify that the second write access occurred;
identify that the PML buffer of the nested hypervisor is full; and
trigger an exit from the nested guest to the nested hypervisor.

15. The system of claim 14, wherein:
the nested extended page table maps the second nested guest physical address to a nested hypervisor physical address,
the shadow extended page table maps the second nested guest physical address to a host physical address.

16. The system of claim 14, wherein the nested hypervisor is further configured to:
associate a first virtual machine control structure with the nested extended page table;
associate the first virtual machine control structure with the PML buffer of the nested hypervisor; and
set a first PML index in the first virtual machine control structure,
wherein the host hypervisor is further configured to associate a second virtual machine control structure with the shadow extended page table.

17. The system of claim 16, wherein by storing the first nested guest physical address in the PML buffer of the nested hypervisor, the host hypervisor is further configured to:
read the first PML index,
compute a guest physical address from the first PML index and the PML buffer of the nested hypervisor,
store the first nested guest physical address at a nested hypervisor physical address, and
decrement the first PML index.

18. The system of claim 16, wherein the nested hypervisor is further configured to:
associate a third virtual machine control structure with the nested extended page table;
associate the third virtual machine control structure with the PML buffer of the nested hypervisor; and
set a second PML index in the third virtual machine control structure,
wherein the host hypervisor is further configured to associate a fourth virtual machine control structure with the shadow extended page table.

19. The system of claim 13, wherein the PML buffer of the nested hypervisor is a 4 KB buffer.

20. A computer-readable non-transitory storage medium comprising executable instructions that, when executed, are configured to cause a host hypervisor to:

emulate a nested environment, wherein the nested environment includes a guest virtualized by the host hypervisor, wherein the guest includes a nested hypervisor and a nested guest;
identify a first mapping in a nested extended page table;
identify a first bit in a first page table entry of the nested extended page table, wherein the first bit is clean;
create a second mapping that is write-protected in a shadow extended page table;
perform a first write access to a first page in the nested guest, wherein the first page has a first nested guest physical address corresponding to the second mapping;
responsive to performing the first write access to the first page, trigger a first exit from the nested guest to the host hypervisor;
identify that the first write access occurred;
store the first nested guest physical address in a page modification log (PML) buffer of the nested hypervisor;
set the first bit as a dirty bit; and
return to the nested guest.

* * * * *